(12) United States Patent
Gharib

(10) Patent No.: US 10,358,878 B2
(45) Date of Patent: Jul. 23, 2019

(54) DRIVESHAFT CATCH ASSEMBLY WITH PRESSURE PLUGS

(71) Applicant: Halliburton Energy Services, Inc., Houston, TX (US)

(72) Inventor: Hossam Mohamed Gharib, Edmonton (CA)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 13 days.

(21) Appl. No.: 15/558,124

(22) PCT Filed: Apr. 14, 2015

(86) PCT No.: PCT/US2015/025675
§ 371 (c)(1),
(2) Date: Sep. 13, 2017

(87) PCT Pub. No.: WO2016/167743
PCT Pub. Date: Oct. 20, 2016

(65) Prior Publication Data
US 2018/0044997 A1 Feb. 15, 2018

(51) Int. Cl.
*E21B 4/00* (2006.01)
*E21B 17/04* (2006.01)
(Continued)

(52) U.S. Cl.
CPC .............. *E21B 17/04* (2013.01); *E21B 4/003* (2013.01); *E21B 41/0021* (2013.01);
(Continued)

(58) Field of Classification Search
CPC ...... F16C 2352/00; E21B 4/003; E21B 17/04; E21B 41/002
See application file for complete search history.

(56) References Cited

U.S. PATENT DOCUMENTS 3,211,232 A 10/1965 Grimmer
5,690,434 A 11/1997 Beshoory et al.
(Continued)

FOREIGN PATENT DOCUMENTS

WO 2014126889 8/2014

OTHER PUBLICATIONS

International Patent Application No. PCT/US2015/025675, "International Search Report and Written Opinion", dated Nov. 23, 2015, 14 pages.

*Primary Examiner* — Thomas R Hannon
(74) *Attorney, Agent, or Firm* — Kilpatrick Townsend & Stockton LLP

(57) ABSTRACT

A driveshaft transmission assembly may include a catch assembly having a catch mechanism and pressure plugs. The catch assembly may prevent the loss of certain driveshaft transmission assembly components downhole in the event of a failure of the driveshaft transmission due to dynamic loads produced during operation in a drilling system. The catch mechanism may be coupled to a radial bearing assembly by the pressure plugs. The pressure plugs may secure the catch mechanism to the radial bearing assembly during operation of the driveshaft transmission assembly using a normal force created by a pressure differential between downhole pressure external to the catch mechanism and ambient pressure sealed in the recesses of the radial bearing assembly.

20 Claims, 7 Drawing Sheets

(51) Int. Cl.
*F16D 3/02* (2006.01)
*E21B 41/00* (2006.01)
*F16C 41/00* (2006.01)
*E21B 4/02* (2006.01)

(52) U.S. Cl.
CPC ............... *F16C 41/00* (2013.01); *F16D 3/02* (2013.01); *E21B 4/02* (2013.01); *F16C 2352/00* (2013.01)

(56) References Cited

U.S. PATENT DOCUMENTS

| | | |
|---|---|---|
| 5,699,867 A | 12/1997 | Jones et al. |
| 6,045,166 A | 4/2000 | Krause |
| 6,561,290 B2 | 5/2003 | Blair et al. |
| 6,827,162 B2 | 12/2004 | Fisher |
| 7,445,061 B1 | 11/2008 | Falgout, Sr. et al. |
| 8,025,110 B2 | 9/2011 | Falgout, Jr. et al. |
| 2009/0196541 A1* | 8/2009 | Johnson .................. E21B 4/003 384/114 |
| 2011/0290505 A1 | 12/2011 | Renshaw et al. |
| 2014/0311753 A1 | 10/2014 | Hanson et al. |
| 2015/0041153 A1 | 2/2015 | McArthur et al. |
| 2015/0041219 A1 | 2/2015 | Leblanc et al. |
| 2015/0096809 A1 | 4/2015 | Kerstetter |
| 2015/0368985 A1* | 12/2015 | Eppink .................... E21B 3/00 175/57 |

* cited by examiner

DRIVESHAFT CATCH ASSEMBLY WITH PRESSURE PLUGS

TECHNICAL FIELD

The present disclosure relates generally to an assembly for a driveshaft transmission for use downhole and, more particularly (although not necessarily exclusively), to a driveshaft catch assembly with pressure plugs.

BACKGROUND

Mud motors utilize fluid energy converted to mechanical energy to provide shaft rotation to a drill string or drill bit. Because the mud motor is a highly loaded section of a drilling tool, it is prone to critical damage during motor transmission failure. Failure of the motor transmission may result in critical damage to the transmission assembly, including the separation of components from the transmission assembly. Where such separation occurs, these components may be lost downhole. The lost components dropped downhole can prevent further progression in drilling and can cause significant delays. The loss of components downhole may even result in a drilling project being abandoned. A procedure known as "fishing" is sometimes used to retrieve the lost components, but this procedure is costly and time-consuming, and may be ineffective.

DETAILED DESCRIPTION

Certain aspects and examples of the present disclosure relate to a catch assembly including a catch mechanism coupled to a radial bearing assembly in a driveshaft transmission assembly by pressure plugs. The pressure plugs may be received by openings in the catch mechanism and further received by recesses on the radial bearing assembly to couple the catch mechanism to the radial bearing assembly. The pressure plugs may include plug rings that are positioned on the pressure plugs to seal ambient pressure in the recesses on the radial bearing assembly when the pressure plugs are received by the recesses. A downhole pressure in a borehole may be applied to the pressure plugs while the driveshaft transmission assembly is placed in the borehole for operating a drilling system. The pressure differential between the downhole pressure in the borehole and the ambient pressure sealed in the recesses of the radial bearing assembly may allow for the pressure plugs to secure the catch mechanism to the radial bearing assembly during operation of driveshaft transmission assembly in the drilling system.

The use of pressure plugs to couple the catch assembly to the downhole rotating radial bearing may result in a simpler, more cost-effect, and efficient installation and maintenance of the driveshaft transmission assembly. The use of other coupling mechanism such as threads or snap rings may require heightened inspections and additional testing which can be both costly and time-consuming. Pressure plugs may be easily removed for inspection as the pressure differential securing the catch assembly to the radial bearing assembly is no longer present when the driveshaft transmission assembly is removed from the high-pressured borehole.

The terms "inner," "outer," "internal," and "between," as used in the present disclosure, may refer to a radial orientation toward or away from the center of the driveshaft transmission assembly. The terms "uphole," "downhole," and "proximate," as used in the present disclosure, may refer to an axial orientation toward or away from the surface. Each of these terms is used only to provide examples of relation and orientation of the driveshaft transmission components with respect to each other, and is not meant to limit the scope of the present disclosure.

Figure 1:
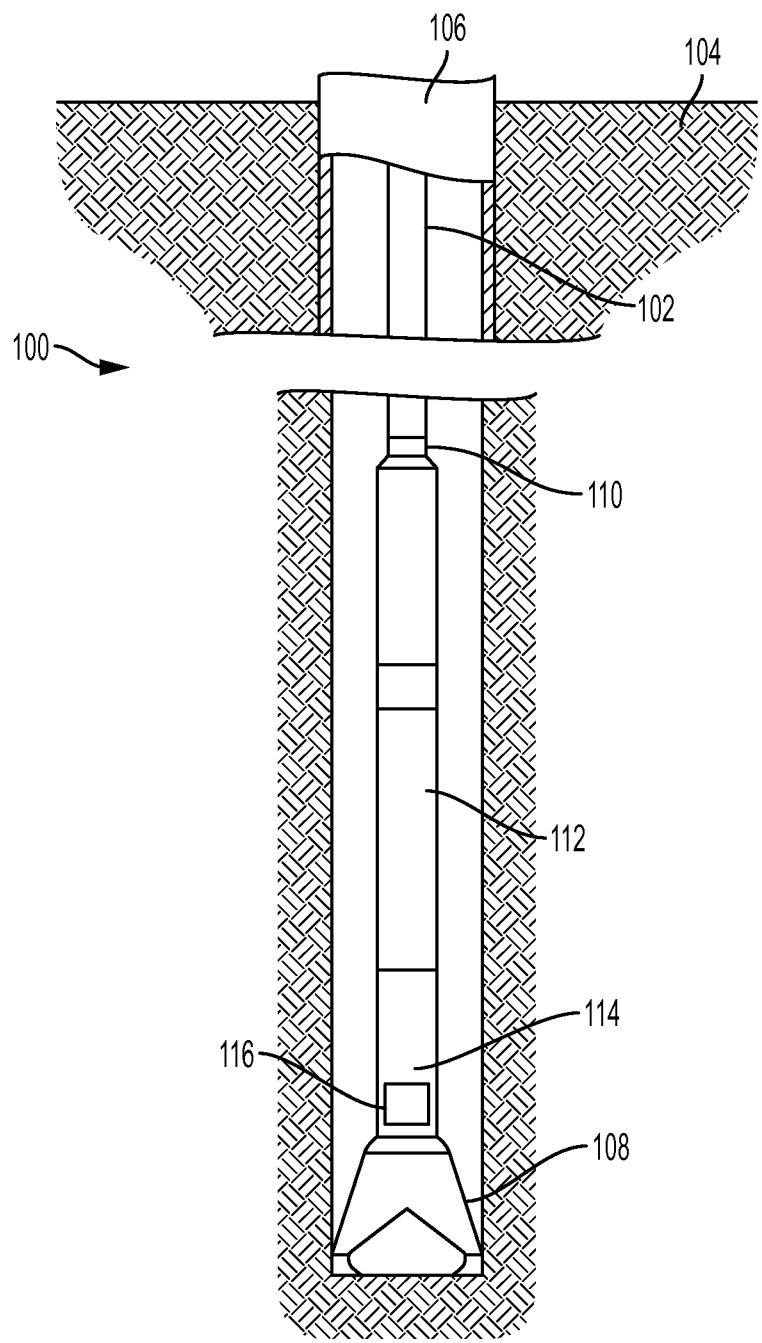
FIG. 1 is a cross-sectional schematic diagram of a drilling system that includes a driveshaft transmission assembly with a catch assembly in a lower end of a driveshaft transmission assembly according to one aspect of the present disclosure.

Various aspects of the present disclosure may be implemented in various drilling systems. FIG. 1 illustrates an example of such a drilling system 100 that includes a drill string 102. The drill string 102 of a drilling rig (not shown) may include segmented pipes that may extend below the surface 104 in a borehole, such as a wellbore 106. The drill string 102 may transmit drilling fluid (or mud) and the torque necessary to operate a drill bit 108. Also, the weight of the drill string 102 and/or various components of the drilling system 100 may exert an axial force on the drill bit 108.

The drill string 102 may include a drill pipe 110 and a bottom hole assembly 112. The bottom hole assembly 112 may include various components, such as a downhole motor assembly 114 and the drill bit 108.

Though placement of the assemblies disclosed herein may vary without departing from the scope of the present subject matter, the assemblies of the present disclosure may be included in the lower end of the downhole motor assembly 114 and near the drill bit 108. For example, the driveshaft transmission assembly 116 depicted in FIG. 1 represents a placement according to one example. Placement of the assemblies as close to the drill bit 108 as possible may reduce the moment arm load induced from directional drilling. Reducing the moment arm load may result in longevity of the motor assembly and bearings of the drilling installation, and may reduce the likelihood of failure of the motor.

During operation of the driveshaft transmission assembly 116, dynamic loads may be placed on a drill motor by the action of the drill bit 108 and by vibrations of the drill string 102. In certain instances, the dynamic loads may cause the drill motor to fail and components of the driveshaft transmission assembly 116 to separate. The driveshaft transmission assembly 116 may include a catch assembly coupled to a radial bearing assembly by pressure plugs to retain components of the driveshaft transmission and prevent the loss of components downhole in the event of separation.

Figure 2:
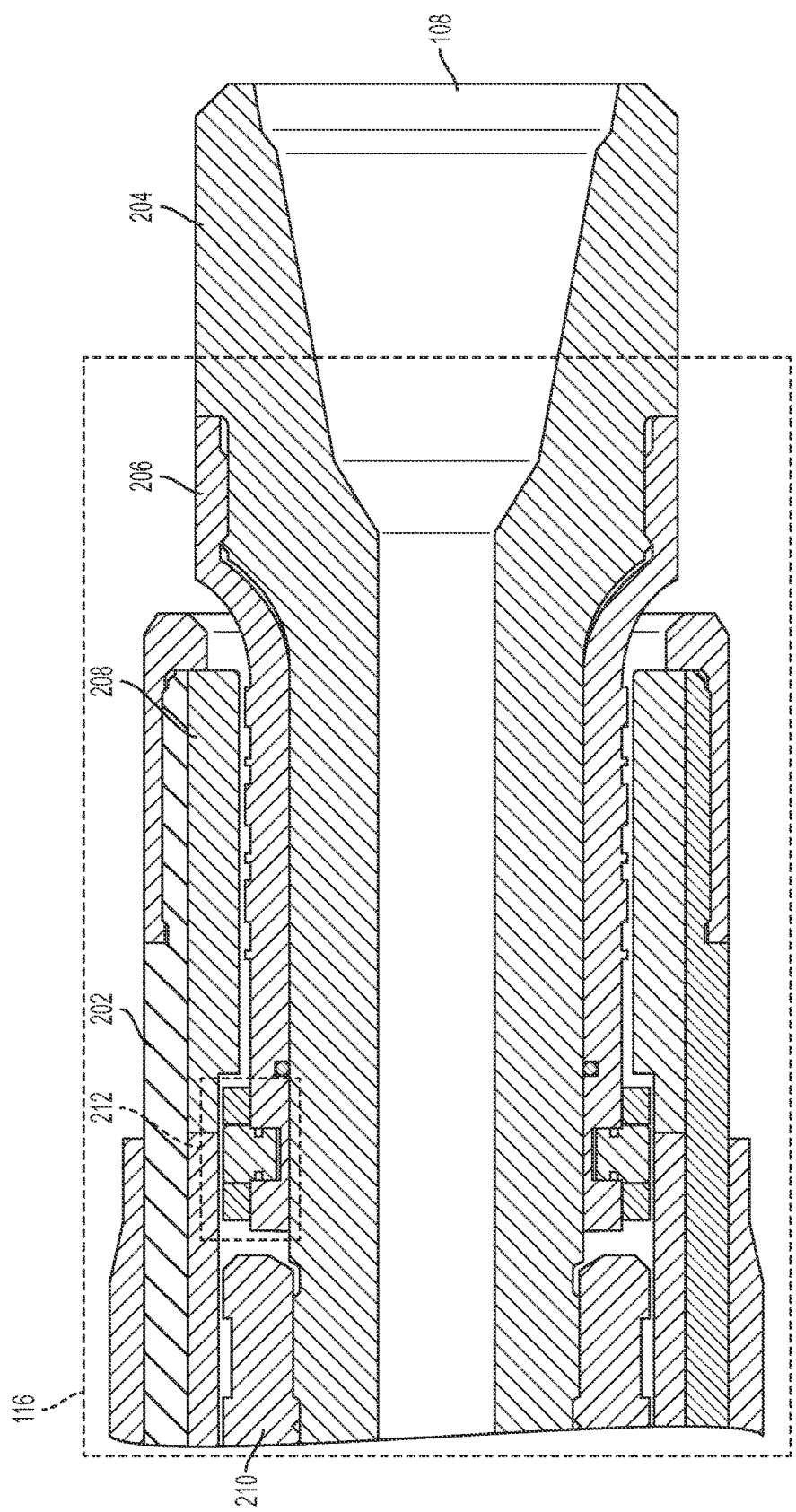
FIG. 2 is a cross-sectional view of a driveshaft transmission assembly that includes a catch assembly according to one aspect of the present disclosure.

FIG. 2 shows an example of a driveshaft transmission assembly 116 according to one aspect of the present disclosure. The driveshaft transmission assembly 116 includes a bearing housing 202 and certain bearing assemblies of a driveshaft 204. One or more radial bearing assemblies may be included internal to the bearing housing 202. For example, FIG. 2 includes a downhole rotating radial bearing 206, and a stationary radial bearing 208. A thrust bearing assembly 210 may also be included internal to the bearing housing 202. In some aspects, the downhole rotating radial bearing 206 may be coupled to the driveshaft 204. The downhole rotating radial bearing 206 may be radially positioned between the driveshaft 204 and the stationary radial bearing 208. The stationary radial bearing 208 may be radially positioned between the downhole rotating radial bearing 206 and the bearing housing 202. Although only these radial and thrust bearing assemblies are described in FIG. 2, alternative or additional bearing assemblies may be included in various configurations in the driveshaft transmission assembly 116 without departing from the scope of the present disclosure.

Figure 3:
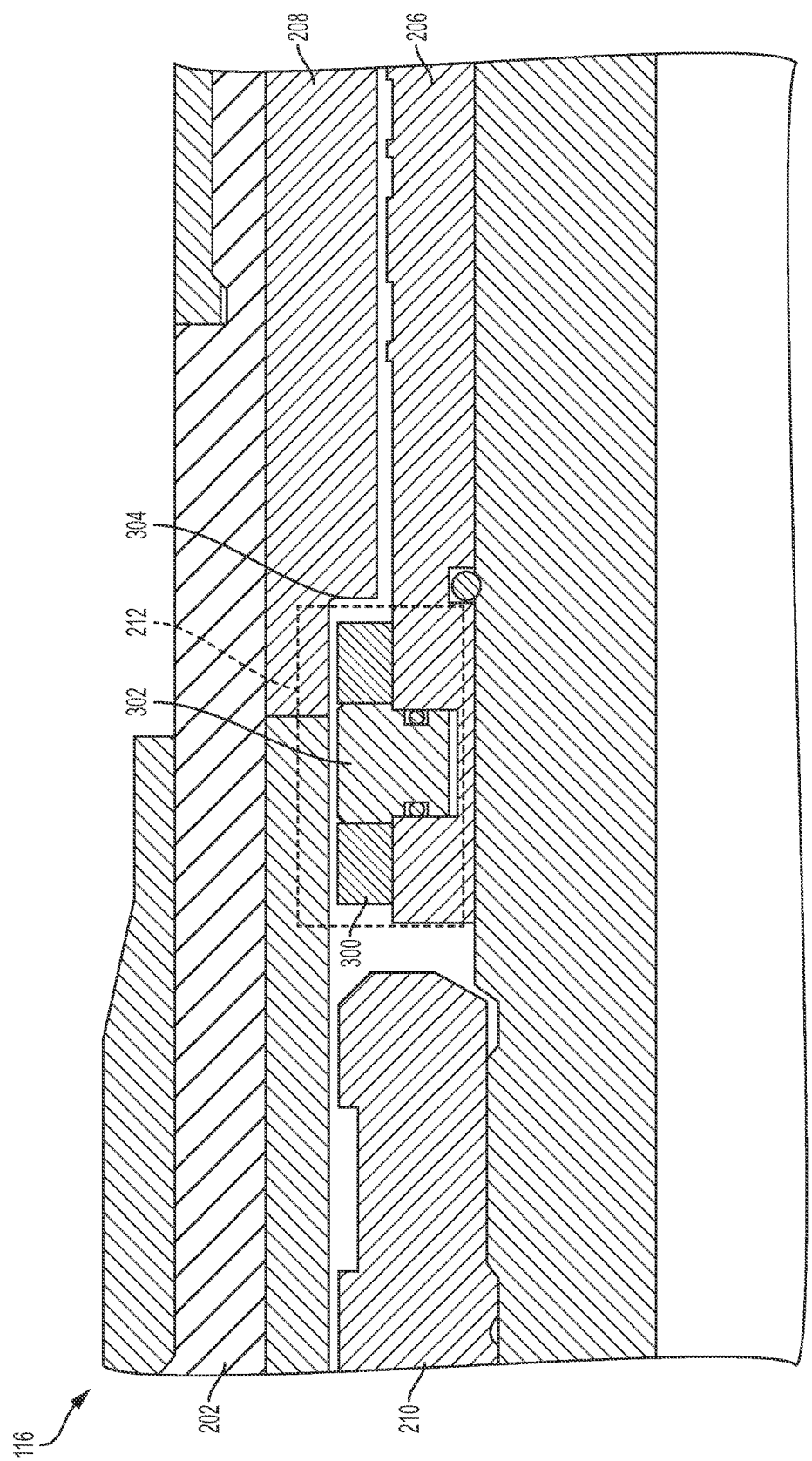
FIG. 3 is a cross-sectional view of part of the driveshaft transmission assembly of FIG. 2 according to one aspect of the present disclosure.

The driveshaft transmission assembly 116 may also include a catch assembly 212 coupled to the downhole rotating radial bearing 206 by pressure plugs. FIG. 3 shows a portion of the driveshaft transmission assembly including the catch assembly 212 including a catch mechanism 300 and pressure plugs 302. The catch mechanism 300 may be one or more split-ring sleeves, a shell, a ring, or other rigid mechanism sized to encircle a portion of a radial bearing assembly. For example, FIG. 3 shows the catch mechanism 300 encircling a portion of the downhole rotating radial bearing 206. The catch mechanism is coupled to the downhole rotating radial bearing 206 by the pressure plugs 302.

The catch mechanism 300 is radially positioned between the downhole rotating radial bearing 206 and the bearing housing 202. The catch mechanism 300, and other components of the catch assembly 212, may be independent of the bearing housing 202. The catch mechanism 300 is axially positioned between the thrust bearing assembly 210 (on the uphole side of the catch assembly 212) and the stationary radial bearing 208 (on the downhole side of the catch assembly 212).

The catch mechanism 300 may have an outer diameter greater than the outer diameter of the downhole rotating radial bearing 206. At least a portion of the catch mechanism 300 may extend beyond the outer diameter of the downhole rotating radial bearing 206 when the catch mechanism 300 is coupled to the downhole rotating radial bearing 206.

Following a failure of the drill motor in the drilling system, the catch assembly 212 of the driveshaft transmission assembly 116 may prevent certain components of the driveshaft transmission assembly 116, including the driveshaft 204 and drill bit 108, from falling, or being lost, downhole in the event of separation. For example, when separation of driveshaft transmission assembly components occurs, the outer surface of the catch mechanism 300 may create an interference with a contact shoulder 304 on the stationary radial bearing 208 to prevent the catch assembly 212 from moving in a downhole direction beyond the contact shoulder 304. Because the catch mechanism 300 may be coupled to the downhole rotating radial bearing 206 by the pressure plugs 302, the interference of the catch mechanism 300 with the contact shoulder 304 of the stationary radial bearing 208 may prevent the downhole rotating radial bearing 206 and any components directly or indirectly coupled thereto (e.g., driveshaft 204, drill bit 108) from falling downhole.

Figure 4:
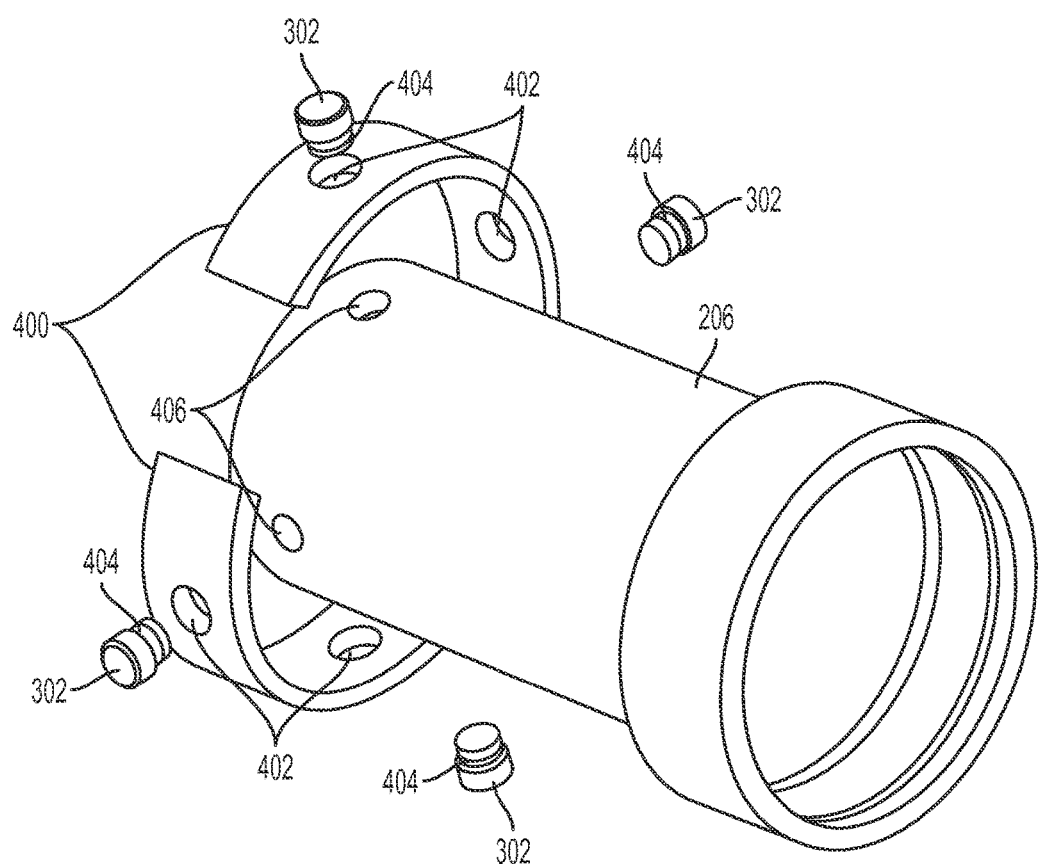
FIG. 4 is an exploded view of a catch assembly according to one aspect of the present disclosure.

FIG. 4 shows an example of a catch assembly 212 that includes the catch mechanism 300 and the pressure plugs 302. The catch mechanism 300 includes split-ring sleeves 400. Although two are shown, any number of split-ring sleeves 400 may be included. The split-ring sleeves may include a rigid material (e.g., steel), and have an inner diameter that is sized to encircle to the downhole rotating radial bearing 206 when assembled. The split-ring sleeves 400 include openings 402. The openings 402 are sized to receive the pressure plugs 302. In some aspects, the pressure plugs 302 may include a resilient material (e.g., rubber, plastic, etc.), but the material may have enough rigidity to couple the split-ring sleeves 400 to the downhole rotating radial bearing 206. In some aspects, the pressure plugs 302 may include a rigid material (e.g., steel). Although four pressure plugs 302 are shown in FIG. 4, the catch assembly 212 may include any number of pressure plugs 302 sufficient to couple the split-ring sleeves 400 to the downhole rotating radial bearing 206. Similarly, although four openings 402 are shown in the split-ring sleeves 400, the catch mechanism 300 may include any number of openings 402.

The pressure plugs 302 may include plug rings 404. The plug rings 404 are positioned on the pressure plugs 302 and may be O-rings, gaskets, or any other device including viscoelastic material to flow and be squeezed to create a seal. In some aspects, the pressure plugs 302 may include an indentation or groove to receive the plug rings 404. The pressure plugs 302 may be received in the openings 402 on the split-ring sleeves 400. The pressure plugs 302 may be further received in recesses 406 on the downhole rotating radial bearing 206. The plug rings 404 on the pressure plugs 302 may create a seal by squeezing in the recesses 406 as the pressure plugs 302 are received by the recesses 406.

In some aspects, the pressure plugs 302 may be shaped to couple the split-ring sleeves 400 to the downhole rotating radial bearing 206. For example, in FIGS. 3 and 4, the pressure plugs 302 include a bulbous upper portion that is positionable in the openings 404 with a lower portion positionable in the recesses 406. The bulbous upper portion of the pressure plugs 302 may be received in the openings 406 and apply a force on the split-ring sleeves 400 to couple the split-ring sleeves 400 to the downhole rotating radial bearing 206. In another example, the outer edge pressure plugs 302 may be tapered so the pressure plugs 302 apply a force when the thicker end of the pressure plugs 302 is received by the openings 404 to couple the split-ring sleeves 400 to the downhole rotating bearing 206. In other aspects, the pressure plugs 302 may include a resilient material. The resiliency of the pressure plugs 302 may apply a force to couple the split-ring sleeves 400 to the downhole radial bearing 206.

Two recesses 406 are shown on FIG. 4 with two additional recesses 406 not shown on the posterior side of the downhole rotating radial bearing 206. Although four total recesses 406 are included on the downhole rotating radial bearing 206 in FIG. 4, the downhole rotating radial bearing 206 may include any number of recesses. The number of openings 404 on the split-ring sleeves 400 and the number of recesses 406 on the downhole rotating radial bearing 206 may equal the number of pressure plugs 302 in the catch assembly 212 so each of the pressure plugs 302 may be received into corresponding openings 404 and corresponding recesses 406.

Figure 5A:
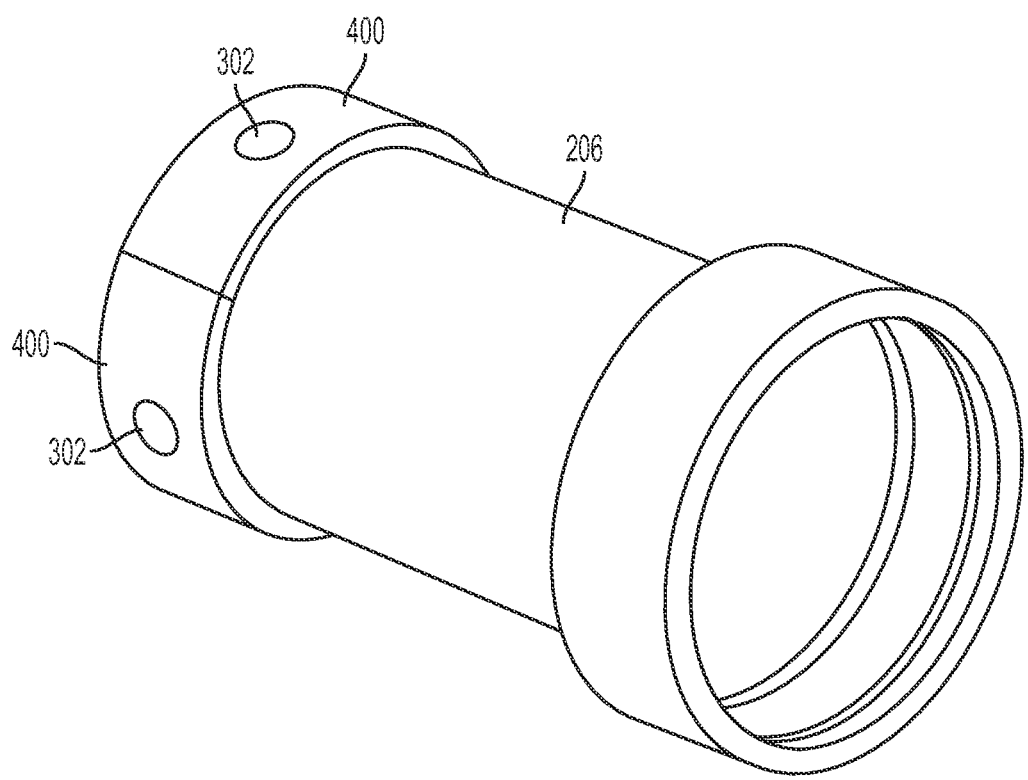
FIG. 5A is a perspective view of an assembled catch assembly according to one aspect of the present disclosure.
Figure 5B:
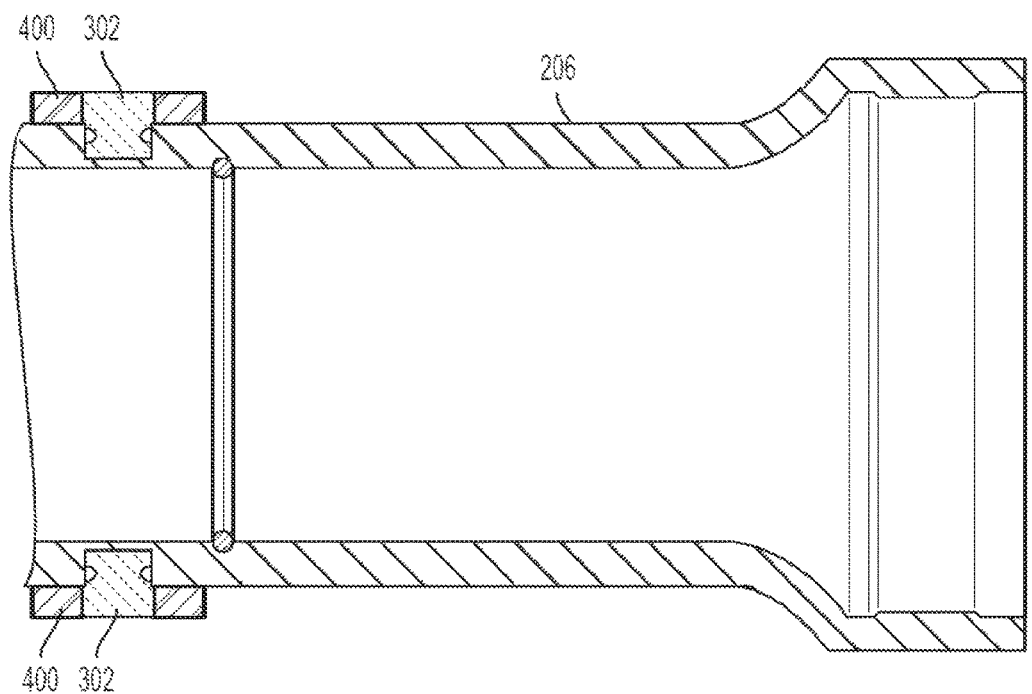
FIG. 5B is a cross-sectional view of the assembled catch assembly of FIG. 5A according to one aspect of the present disclosure.
Figure 5C:
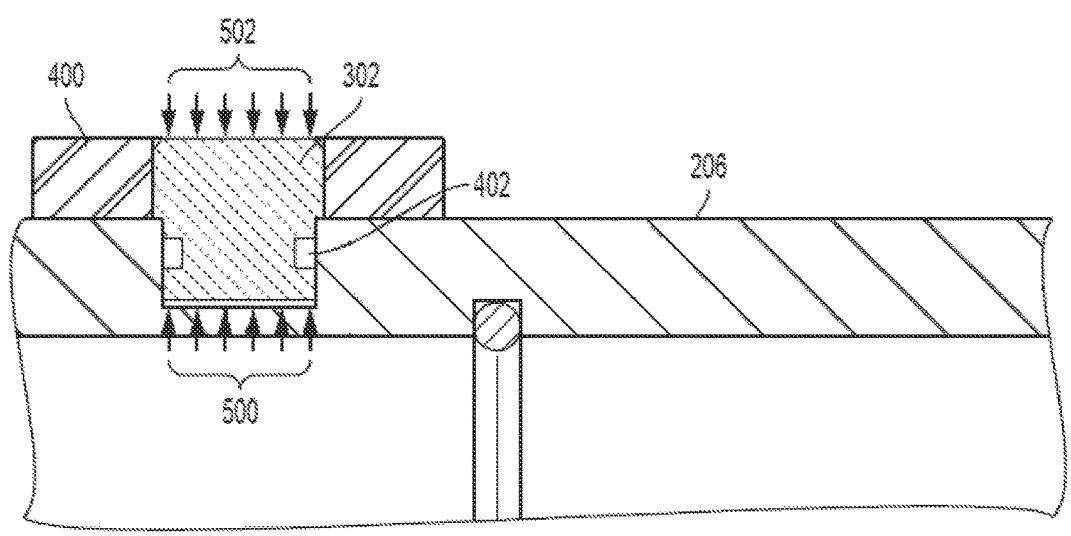
FIG. 5C is a cross-sectional view of part of the assembled catch assembly of FIG. 5A according to one aspect of the present disclosure.

FIGS. 5A-5C show an assembled example of the catch assembly 212 with the split-ring sleeves 400 coupled to the downhole rotating radial bearing 206 by the pressure plugs 302. During installation of the catch assembly 212 on the downhole rotating radial bearing 206, the pressure plugs 302 may be received by the openings 402 on the split-ring sleeves 400 and the recesses 406 on the downhole rotating radial bearing 206. The seal created by a squeeze of the plug rings 404 in the recesses 406 may allow the pressure plugs 302 to retain an ambient pressure 500 in the recesses 406. During operation of the driveshaft transmission assembly 116 in the drilling system 100, or when the driveshaft transmission assembly 116 is otherwise placed in the wellbore 106 (or other borehole), a downhole pressure 502 external to the split-ring sleeves 400 may be placed on the pressure plugs 302. Due to static and dynamic pressure effects of the motor mud in the borehole, the downhole pressure 502 may be higher than the ambient pressure 500 sealed in the recesses to create a pressure differential. The pressure differential created by the ambient pressure 500 and the downhole pressure 502 may apply a normal force on the pressure plugs 302 such that the pressure plugs 302 secure the split-ring sleeves 400 to the downhole rotating radial bearing 206 during operation of the driveshaft transmission assembly 116 in the drilling system 100.

In some aspects, driveshaft catch assemblies are provided according to one or more of the following examples:

EXAMPLE #1

A catch assembly for a driveshaft transmission assembly may include a catch mechanism having openings that are sized to receive pressure plugs. The openings may be positionable proximate to corresponding recesses on a radial bearing assembly. The pressure plugs may be positionable in the openings and the corresponding recesses to couple the catch mechanism to the radial bearing assembly.

EXAMPLE #2

The catch assembly of Example #1 may feature the catch mechanism having an outer diameter sized to interfere with a contact shoulder on a second radial bearing assembly subsequent to components of the driveshaft transmission assembly separating.

EXAMPLE #3

The catch assembly of Examples #1 or 2 may feature the catch mechanism including split-ring sleeves. The split-ring sleeves may be positionable on the radial bearing assembly and have an inner diameter sized to encircle the radial bearing assembly.

EXAMPLE #4

The catch assembly of any of Examples #1-3 may feature the pressure plugs including plug rings sized to create a seal by squeezing in the corresponding recesses on the radial bearing assembly.

EXAMPLE #5

The catch assembly of any of Examples #1-4 may feature the plug rings being positionable on the pressure plugs to retain ambient pressure in the corresponding recesses on the radial bearing assembly.

EXAMPLE #6

The catch assembly of any of Examples #1-5 may feature the pressure plugs including grooves sized to receive pressure plugs and bulbous tips that are positionable in the openings to apply a force on the catch mechanism to couple the catch mechanism to the radial bearing assembly.

EXAMPLE #7

The catch assembly of any of Examples #1-6 may feature the pressure plugs being positioned in the openings and the corresponding recesses to couple the catch mechanism to the radial bearing assembly. The pressure plugs may be further positioned to secure the catch mechanism to the radial bearing assembly during operation of the driveshaft transmission assembly using a normal force created by a pressure differential between downhole pressure external to the catch mechanism and ambient pressure sealed in the corresponding recesses on the radial bearing assembly.

EXAMPLE #8

A driveshaft transmission assembly may feature a radial bearing assembly coupled to a driveshaft. A catch mechanism may be coupled to the radial bearing assembly by pressure plugs received by the radial bearing assembly and the catch mechanism.

EXAMPLE #9

The driveshaft transmission assembly of Example #8 may feature the radial bearing assembly including recesses sized to receive the pressure plugs. The catch mechanism may include openings proximately positioned with the recesses on the radial bearing assembly and sized to receive the pressure plugs.

EXAMPLE #10

The driveshaft transmission assembly of Example #9 may feature the recesses further sized to retain ambient pressure sealed in the recesses by plug rings on the pressure plugs.

EXAMPLE #11

The driveshaft transmission assembly of any of Examples #8-10 may feature the pressure plugs positioned in recesses on the radial bearing assembly to secure the catch mechanism to the radial bearing assembly during operation of the driveshaft transmission assembly using a normal force created by a pressure differential between downhole pressure external to the catch mechanism and ambient pressure sealed in the recesses on the radial bearing assembly.

EXAMPLE #12

The driveshaft transmission assembly of any of Examples #8-11 may feature the catch mechanism including an outer diameter sized to interfere with a contact shoulder on a second radial bearing assembly subsequent to components of the driveshaft transmission assembly separating.

EXAMPLE #13

The driveshaft transmission assembly of any of Examples #8-12 may feature the radial bearing assembly further coupled to a second radial bearing assembly and positioned between the driveshaft and the second radial bearing assembly. The catch mechanism may be positioned uphole of a contact shoulder on the second radial bearing assembly and downhole of a thrust bearing assembly.

EXAMPLE #14

The driveshaft transmission assembly of any of Examples #8-13 may feature the catch mechanism including split-ring sleeves positioned to form a ring that encircles the radial bearing assembly.

EXAMPLE #15

The driveshaft transmission assembly of any of Examples #8-14 may feature the catch mechanism independent of and internal to a bearing housing.

EXAMPLE #16

A driveshaft transmission assembly may feature a catch assembly including a catch mechanism and pressure plugs. The catch mechanism may have openings sized to receive the pressure plugs. A first radial bearing assembly may include recesses sized to receive the pressure plugs. A second radial bearing assembly may include a contact shoulder positionable to interfere with the catch mechanism subsequent to components of the driveshaft transmission assembly separating.

EXAMPLE #17

The driveshaft transmission assembly of Example #16 may feature the openings on the catch mechanism positionable proximate to the recesses on the first radial bearing assembly for receiving the pressure plugs to couple the catch mechanism to the first radial bearing assembly.

EXAMPLE #18

The driveshaft transmission assembly of Examples #16 or 17 may feature the pressure plugs including plug rings positionable on the pressure plugs to seal ambient pressure in the recesses on the first radial bearing assembly.

EXAMPLE #19 driveshaft transmission assembly of any of Examples #16-18 may feature the catch mechanism coupled to the first radial bearing assembly by the pressure plugs. The first radial bearing assembly may be coupled to a driveshaft and the second radial bearing assembly.

EXAMPLE #20

The driveshaft transmission assembly of any of Examples #16-19 may feature the pressure plugs positioned in the openings and the recesses to secure the catch mechanism to the first radial bearing assembly during operation of the driveshaft transmission assembly using a normal force created by a pressure differential between downhole pressure external to the catch mechanism and ambient pressure sealed in the recesses.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A catch assembly for a driveshaft transmission assembly, the catch assembly comprising:
    a catch mechanism including openings sized to receive pressure plugs and positionable proximate to corresponding recesses on a radial bearing assembly; and
    the pressure plugs positionable in the openings and the corresponding recesses to couple the catch mechanism to the radial bearing assembly, the pressure plugs including a viscoelastic material to create a seal by squeezing in the corresponding recesses causing a pressure differential that retains the pressure plugs.

2. The catch assembly of claim 1, wherein the catch mechanism has an outer diameter sized to interfere with a contact shoulder on a second radial bearing assembly subsequent to components of the driveshaft transmission assembly separating.

3. The catch assembly of claim 1, wherein the catch mechanism comprises split-ring sleeves, the split-ring sleeves being positionable on the radial bearing assembly and having an inner diameter sized to encircle the radial bearing assembly.

4. The catch assembly of claim 1, wherein the pressure plugs include plug rings comprising the viscoelastic material.

5. The catch assembly of claim 4, wherein the plug rings are positionable on the pressure plugs to retain ambient pressure in the corresponding recesses on the radial bearing assembly.

6. The catch assembly of claim 5, wherein the pressure plugs include grooves sized to receive the plug rings and bulbous tips positionable in the openings to apply a force on the catch mechanism to couple the catch mechanism to the radial bearing assembly.

7. The catch assembly of claim 1, wherein the pressure plugs are positioned in the openings and the corresponding recesses to couple the catch mechanism to the radial bearing assembly; and
    wherein the pressure plugs are further positioned to secure the catch mechanism to the radial bearing assembly during operation of the driveshaft transmission assembly using a normal force created by the pressure differential between downhole pressure external to the catch mechanism and ambient pressure sealed in the corresponding recesses on the radial bearing assembly.

8. A driveshaft transmission assembly, comprising:
    a radial bearing assembly coupled to a driveshaft;
    a catch mechanism coupled to the radial bearing assembly by pressure plugs received by the radial bearing assembly and the catch mechanism, the pressure plugs including a viscoelastic material to create a seal causing a pressure differential to retain the catch mechanism.

9. The driveshaft transmission assembly of claim 8, wherein the radial bearing assembly includes recesses sized to receive the pressure plugs,
    wherein the catch mechanism includes openings proximately positioned with the recesses on the radial bearing assembly and sized to receive the pressure plugs.

10. The driveshaft transmission assembly of claim 9, wherein the recesses are further sized to retain ambient pressure sealed in the recesses by plug rings on the pressure plugs.

11. The driveshaft transmission assembly of claim 8, wherein the pressure plugs are positioned in recesses on the radial bearing assembly to secure the catch mechanism to the radial bearing assembly during operation of the driveshaft transmission assembly using a normal force created by the pressure differential between downhole pressure external to the catch mechanism and ambient pressure sealed in the recesses on the radial bearing assembly.

12. The driveshaft transmission assembly of claim 8, wherein the catch mechanism includes an outer diameter sized to interfere with a contact shoulder on a second radial bearing assembly subsequent to components of the driveshaft transmission assembly separating.

13. The driveshaft transmission assembly of claim 8, wherein the radial bearing assembly is further coupled to a second radial bearing assembly and is positioned between the driveshaft and the second radial bearing assembly; and
    wherein the catch mechanism is positioned uphole of a contact shoulder on the second radial bearing assembly and downhole of a thrust bearing assembly.

14. The driveshaft transmission assembly of claim 8, wherein the catch mechanism comprises split-ring sleeves positioned to form a ring that encircles the radial bearing assembly.

15. The driveshaft transmission assembly of claim 8, wherein the catch mechanism is independent of and internal to a bearing housing.

16. A driveshaft transmission assembly, comprising:
    a catch assembly including a catch mechanism and pressure plugs, the catch mechanism having openings sized to receive the pressure plugs, the pressure plugs including a viscoelastic material to create a seal;
    a first radial bearing assembly including recesses sized to receive the pressure plugs, the seal being created by the viscoelastic material squeezing in the recesses causing a pressure differential that retains the pressure plugs; and
    a second radial bearing assembly including a contact shoulder positionable to interfere with the catch mechanism subsequent to components of the driveshaft transmission assembly separating.

17. The driveshaft transmission assembly of claim 16, wherein the openings on the catch mechanism are positionable proximate to the recesses on the first radial bearing assembly for receiving the pressure plugs to couple the catch mechanism to the first radial bearing assembly.

18. The driveshaft transmission assembly of claim 16, wherein the pressure plugs include plug rings comprising the viscoelastic material.

19. The driveshaft transmission assembly of claim 16, wherein the catch mechanism is coupled to the first radial bearing assembly by the pressure plugs; and
    wherein the first radial bearing assembly is coupled to a driveshaft and the second radial bearing assembly.

20. The driveshaft transmission assembly of claim 19, wherein the pressure plugs are positioned in the openings and the recesses to secure the catch mechanism to the first radial bearing assembly during operation of the driveshaft transmission assembly using a normal force created by the pressure differential between downhole pressure external to the catch mechanism and ambient pressure sealed in the recesses.

* * * * *